March 31, 1970 TADAHIDE TODA ET AL 3,503,417
CONTROL VALVE FOR REGULATING FLOW OF BLOW-BY GAS
Filed Aug. 7, 1967 2 Sheets-Sheet 2
FIG. 5
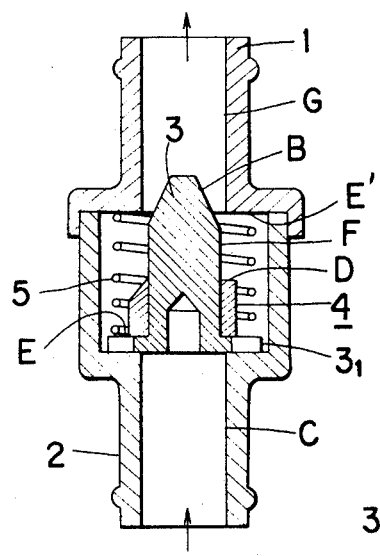
FIG. 6
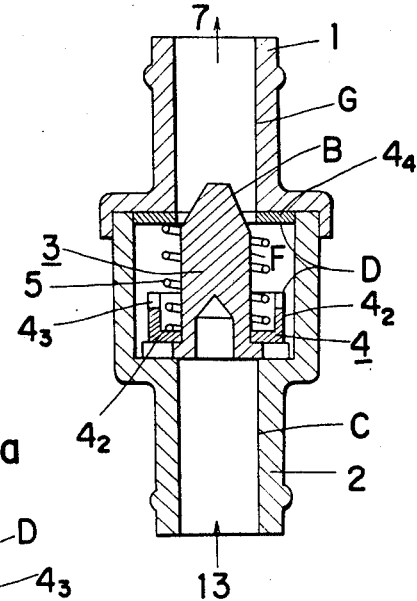
FIG. 5a
FIG. 7
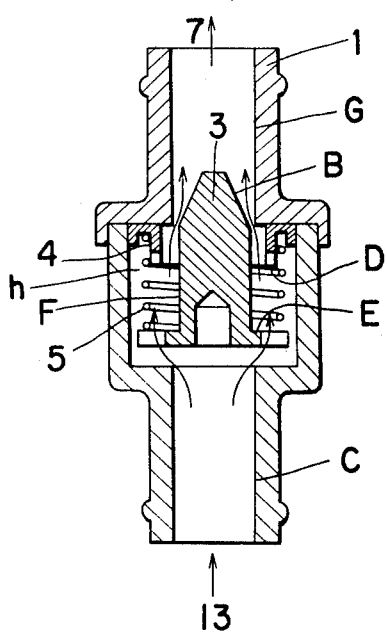
FIG. 8
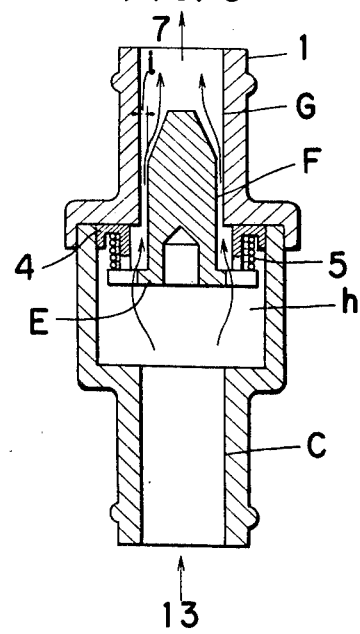

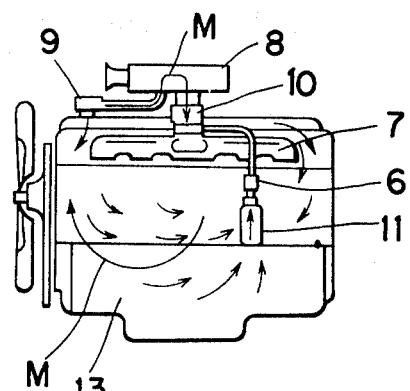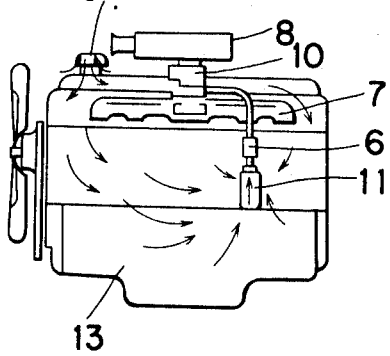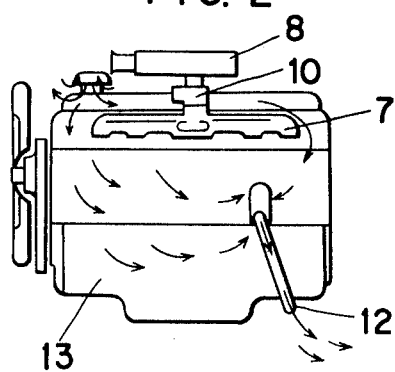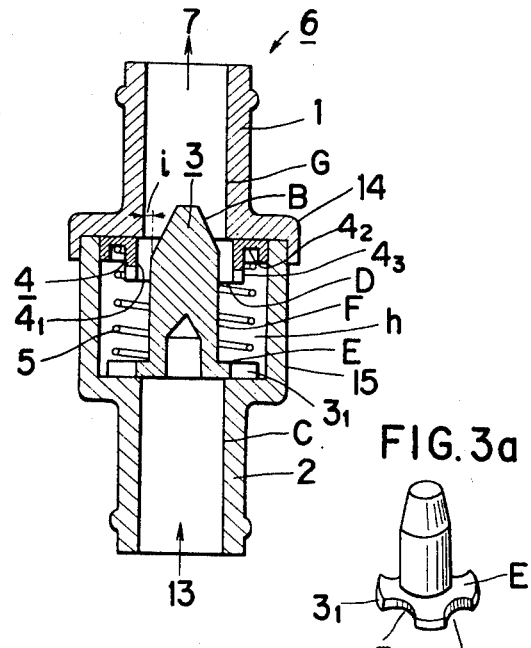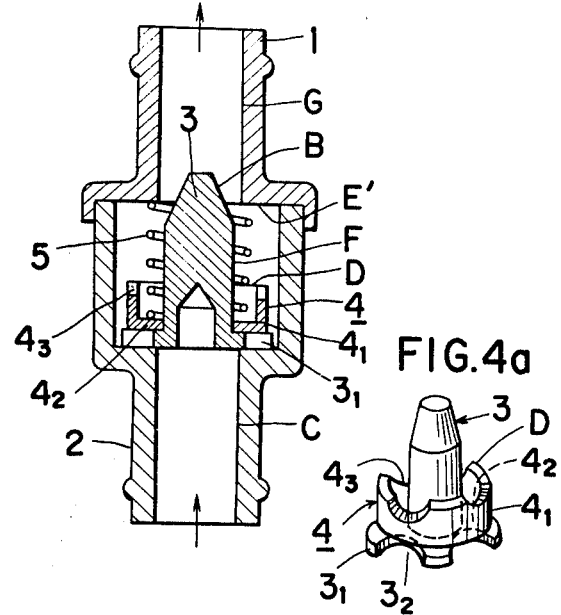

United States Patent Office 3,503,417
Patented Mar. 31, 1970

3,503,417
CONTROL VALVE FOR REGULATING FLOW
OF BLOW-BY GAS
Tadahide Toda and Mitsumasa Yamada, Toyota, Japan,
assignors to Toyota Jidosha Kogyo Kabushiki Kaisha,
Toyota, Japan, a corporation of Japan
Filed Aug. 7, 1967, Ser. No. 658,895
Int. Cl. F16k 17/04
U.S. Cl. 137—480                         4 Claims

ABSTRACT OF THE DISCLOSURE

A control valve for regulating the flow of blow-by gas in an internal combustion engine which comprises a free piston axially movable in response to the negative pressure on the intake manifold side of the engine between a first position in which it cuts off said flow, through an intermediate position permitting maximum flow, through a succession of positions in which said flow is progressively reduced to a final position at which said flow is at a predetermined minimum. The piston is spring-biassed toward the first position and a cushion is provided between the surfaces on the piston and chamber wall which contact each other at said final position. The piston carries a tapered projection which is progressively inserted into a portion of the flow path having a diameter slightly greater than that of said projection in order to produce said progressive reduction in the volume of flow. Both the head of the piston and the cushioning means are peripherally notched to provide a flow path at all but said first position of the piston.

The present invention relates to a flow rate control valve, and particularly to a flow control valve to be positioned in the path through which the blow-by gas in an engine crankcase is recirculated to the combustion chamber for the purpose of recombustion.

Among the harmful gases released from the automobile engine into the atmosphere, the so-called blow by gas, i.e., the gas which leaks into the crankcase from between the pistons and their cylinders, is predominantly composed of unburnt mixed gas, which is rich in hydrocarbons and constitutes one of the air-pollutants. From the standpoint of chemical composition, the blow-by gas can be re-burnt. For this reason, the proposal has already been made, to substitute for the conventional crankcase directly communicating with the atmosphere and releasing the harmful blow-by gas, a closed or open type crankcase which prevents the release of blow-by gas into the atmosphere; and to form a recirculating system for the purpose of returning the blow-by gas to the suction side and to burn it again, thereby contributing to the abatement of air pollution.

There are several different systems available for introducing the blow-by gas at different points on the suction side in said recirculating system. This application relates to a system of introducing the blow-by gas at down-stream of the carburettor. In this case the important thing is to keep the air-fuel ratio, i.e., the ratio of air weight to fuel weight, in the mixed gas of the carburettor adequate; and at the same time to assure complete disposal of the generated blow-by gas. It is for this purpose that the blow-by gas flow control valve which makes optimum control of the circulated rate of gas flow is provided in said recirculating system.

Generally speaking, the leakage of blow-by gas increases at higher engine speeds when the engine load is heavier, while it decreases as the engine load is lighter. On the contrary, the negative pressure in the suction pipe downstream of the carburettor will be higher at lighter loads under which the flow of blow-by gas is less, resulting in a larger suction of blow-by gas. Therefore the requirement to be met by the control valve which regulates the recirculation of blow-by gas is that it must reduce the cross section of the blow-by gas flow passage and supply a smaller proportion of blow-by gas, when the negative pressure on the intake manifold side downstream of the carburettor is high; and to enlarge the cross section of the blow-by gas flow passage and supply a relatively concentrated blow-by gas, when the negative pressure on the intake manifold side is low.

Although several types of control valves meeting the above requirement are available, commonly the floating piston type which works on the negative pressure in the intake manifold is recommended for its excellent performance. However, the conventional floating piston type control-valve, which is provided with small orifices of definite dimensions for the purpose of giving a minimum cross-section of blow-by gas flow passage, has the drawback that the valve soon ceases to function properly because said orifices become contaminated, deformed or clogged with deposits of lubricating oil or vapour in the blow-by gas; and it requires considerable maintenance and inspection. Meanwhile, being generally made of ferrous metals having a relatively high specific gravity to make the motion reliable, the floating piston produces a metallic sound when it goes up and hits the top wall in the valve-chamber in which it is housed; or it produces an impact noise between the top and bottom walls of valve-chamber, when it makes a vertical vibration due to resonance with the pulsation of the intake manifold negative pressure in a certain range of engine loads.

Thus, the main object of this invention is to provide a blow-by gas flow control valve which can be expected to perform reliably all the time, with no small orifices subject to the above-mentioned troubles; and which has a floating piston which can move quietly without producing any hitting sound or impact noise.

Another object of this invention is to provide a blow-by gas flow control valve which is highly reliable in performance, simple in construction and very convenient to maintain and inspect, said control valve having a floating piston within the central valve-chamber of the casing with an upper air path leading to the intake manifold and a lower air path leading to the crankcase, said floating piston being held to the valve-inactive position where said lower air path is closed by a spring stretched between the lower flange of the piston and the top wall of said valve-chamber; said piston being drawn upward, overcoming the force of above-mentioned spring when the pressure on the intake manifold side is negative, so that said piston moves into its valve-active position. In this position, the cylindrical portion adjacent the tapered piston head enters the upper air path, but there is a clearance between this cylindrical portion and the wall defining the path. Either the top wall of the valve-chamber housing the above-mentioned spring or the lower flange surface is fitted with a cushioning stopper having a bearing surface engaged by the above-mentioned spring. This stopper is in contact with the above-mentioned top wall or flange surface and the annular wall rising from said bearing surface contacts the opposite part at the valve-active position. The annular wall of said stopper has slots for passing the air and the blow-by gas passing through said slots at the valve-active position is restricted to a minimum flow-section by the gap between the above-mentioned cylindrical portion of piston and the wall defining the upper air path. As a consequence, the depth to which the tapered head of the piston enters the upper air path is regulated in accordance with the degree of negative pressure on the intake manifold side, thereby gradually reducing the cross section of the flow passage until the minimum cross section is reached when the cylindrical portion of the piston comes into the upper air path. Said piston is free to move axially of the casing and rotate relative thereto so that any contamination of the upper air path is prevented by repeated contact between the wall thereof and the cylindrical portion of the piston.

Still another object of this invention is to provide a blow-by gas flow control valve which can be used to regulate the flow rate of the blow-by gas in any flow path by taking the dimensions of the upper air path in said casing as reference, i.e., by adopting the bore standard system, and varying the weight, dimensions of the piston and the stiffness of the spring which holds the piston.

A third object of this invention is to provide a blow-by gas flow control valve in which the above-mentioned cushioning stopper is formed as an annular body with a thickness greater than the width of the gap between the wall defining said upper air path and the cylindrical portion of the piston and provided with slots for air passage on the surface contacting the top wall inside of the valve-chamber. Said annular body is mounted close to the periphery of the cylindrical portion of the piston, thereby greatly simplifying the structure and affording little resistance to the gas flow.

A fourth object of this invention is to provide a blow-by gas flow control valve in which there is provided on the one hand a cushioning stopper fitted on either the top wall in the valve-chamber or the flange surface of the piston, and on the other a cushioning member which provides a reaction surface for the spring and contacts the stopper, thereby reducing both the noise and the abrasion of the contacting parts.

Said objects, and other objects and characteristic features of this invention will become evident and will be more readily understood after reading the following description with reference to the accompanying drawings in which:

FIGURES 1a and 1b show the paths of flow of the blow-by gas sucked into the crankcase in an automobile engine equipped with the blow-by gas flow control valve of this invention, FIGURE 1a illustrating the case in which the crankcase is closed, and FIGURE 1b that in which the crankcase is open;

FIGURE 2 shows the corresponding flow in a conventional engine in which the blow-by gas is directly released into the atmosphere;

FIGURE 3 shows in longitudinal section a blow-by gas flow control valve constituting one embodiment of this invention;

FIGURE 3a is an oblique view showing the floating piston to be housed in the control valve of FIG. 3;

FIGURE 4 is a longitudinal sectional view showing a blow-by gas flow control valve which constitutes another embodiment of this invention;

FIGURE 4a is an oblique view showing a different floating piston adapted to be used in the control valve of FIG. 4;

FIGURE 5 is a longitudinal sectional view of a blow-by gas control valve constituting a third embodiment of this invention;

FIGURE 5a is an oblique view showing a floating piston of a third type to be housed in the control valve of FIG. 5;

FIGURE 6 is a longitudinal sectional view showing the top wall inside of the valve-chamber casing equipped with a stopper-bearing part which is struck by the floating piston when it moves up, in an embodiment of this invention which is otherwise as illustrated in FIG. 4;

FIGURE 7 shows in longitudinal section the blow-by gas flow control valve of FIG. 3 with its valve-member in mid-position; and FIGURE 8 shows in longitudinal section the blow-by gas flow control valve of FIG. 3 with its valve-member in its end-position.

In both the closed crankcase of FIG. 1a and the open crankcase of FIG. 1b, there is a blow-by gas flow control valve 6 with one end opening through the oil drain 11 into the crankcase 13, while the other end communicates with the intake manifold side 7 downstream of the carburettor 10. Therefore, the blow-by gas leaking into the crankcase 13 will, under the negative pressure on the intake manifold side 7, as indicated by the arrow, push open the control valve 6 connected with the oil drain 11, and join the mixed gas sucked in through the air cleaner 8 and the carburetor 10, to be recirculated into the engine. Whereas in FIG. 1a the ventilation cap 9 at the crankcase top communicates to the clean side of the air cleaner 8, in FIG. 1b the ventilation cap 9' communicates directly with the atmosphere. The difference between the caps 9, 9' results in a difference in the system of blow-by gas disposal at full engine load. At full load and low speed engine, the negative pressure on the intake manifold side 7 is low and there is no suction of blow-by gas, therefore the control valve 6 does not move. Thus in FIG. 1a the blow-by gas will flow in the direction of the arrow M, to be sucked through the air cleaner 8 into the carburetor 10, while in FIG. 1b some of it will continue to stay within the crankcase, only part of it being discharged into the atmosphere. Even the open crankcase of FIG. 1b, though admittedly somewhat inferior to the totally closed one of FIG. 1a in the effect of air pollution abatement, is found incomparably superior to the conventional one shown in FIG. 2 which communicates directly with the atmosphere through the ventilation pipe 12 and always releases the blow-by gas into the atmosphere as the engine breathes. Therefore the arrangement of FIG. 1b is decidedly effective in abating the air pollution.

According to this invention, the control valve 6 may be constructed as shown in FIG. 3 or in FIG. 3a. The casing of this control valve consists of the upper part 1 defining the upper air path G communicating with the intake manifold side 7 and the lower part 2 defining the lower air path C communicating with the crankcase 13. The enlarged sections 14, 15 formed respectively below and above the upper and lower parts 1, 2 interfit to define a valve-chamber h. This valve-chamber holds a valve body, i.e., the floating piston 3, which is composed of the tapered piston head B, the cylindrical portion F adjacent thereto, and the lower flanged portion E, the spring 5 which biases said lower flanged portion downwardly normally forcing said piston into its valve-inactive position at which the above-mentioned lower air path C is closed. The upper end of said spring 5 is retained by the stopper 4 provided at the top of the valve-chamber, said stopper comprising the part $4_2$ closely fitting the inside wall of valve-chamber in contact with the top wall of valve-chamber, and the annular wall $4_1$ whose top edge D holds the lower flanged portion E of piston 3 at the above-mentioned valve-active position. The upper edge D of said annular wall is provided with a plurality of air passage slots $4_3$ at approximately equal intervals which allow the flow of blow-by gas even at the valve-active position. Meanwhile, the downwardly facing annular groove formed between the part $4_2$, which fits closely against the inside wall of valve-chamber in contact with the top wall of valve-chamber, and the annular wall $4_1$, retains the upper end of the spring 5, thereby preventing said spring 5 from becoming loose. The stopper 4 is made of cushioning material which is resistant to heat, oil and wear, such as synthetic resin or hard rubber. Moreover, the lower flanged portion E of the floating piston 3 is provided with a plurality of slots $3_2$ spaced at equal intervals, leaving the spring-supporting portions $3_1$. These slots $3_2$ permit the passage of the blow-by gas flowing through the slots 43 at the valve-active positions, i.e., when the flanged portion E meets the annular wall $4_1$ of the stopper 4. Moreover, the cylindrical portion F of piston has a diameter such that, when said portion F fits into the upper air path G, there is a clearance $i$ between said portion F and the inner wall of the part 1 which is sufficient to afford a minimum passage for the blow-by gas.

The stopper 4 to be attached in the valve-chamber $h$ may be force-fitted, or it may be attached using an appropriate bonding agent. Thus, in the above-mentioned control valve 6 of this invention, when the engine is idling and the negative pressure on the intake manifold side is high, and under very slight load, as indicated in FIG. 8, the floating piston 3 will be drawn upward against the force of the spring 5 until it meets the top edge D of the annular wall $4_1$ in the stopper 4, with the tapered piston head B and even the cylindrical portion F entering deeply into the upper air path G, with only the gap $i$ corresponding to the difference in diameter between the upper air path G and the cylindrical portion F being left as an air passage. However, the stopper 4, which is made of a cushioning material, causes no noise on impact and produces little wear on bearing surface E. The blow-by gas, without being impeded by the slots $3_2$ and $4_3$, is drawn through the minimum flow passage provided by the clearance $i$ to the intake manifold side 7, thus fulfilling the primary purpose of reducing the flow section of the blow-by gas and diminishing the gas flow at a high negative pressure.

As described above, at full load and low speed engine, under which the intake manifold negative pressure is low, there is no suction of blow-by gas and the control valve 6 assumes the closed position of FIG. 3. However, at medium and high load, that is, when the negative pressure of the intake manifold is lower, and accordingly the leakage of blow-by gas is larger, than at idling or very light load, the floating piston as indicated in FIG. 7 will halt at an intermediate position of equilibrium between the negative pressure of intake manifold and the force of the spring 5, whereby a considerable area for air passage is left between the air path G and the tapered piston head B and through this area a large volume of blow-by gas can pass. Thus if, in the floating piston 3 with tapered portion B, the surface inclination of the tapered portion B is adequately selected, the clearance between the inner wall of the part 1 and the tapered piston head B can be progressively reduced, depending on the depth to which the tapered portion B enters the air path G, i.e., on the magnitude of negative pressure on the intake manifold side, thus regulating the volume of flow of the blow-by gas.

FIGS. 4 to 6 illustrate various modifications of the above-mentioned stopper 4. The stopper indicated in FIG. 4 and in FIG. 4a is mounted on the floating piston 3. The stopper 4 is composed of the part $4_2$ which encircles the cylindrical portion F and engages the lower flanged portion E and the annular wall $4_1$ which rises from the outer edge of said part $4_2$, the upwardly-opening annular groove enclosed by said annular wall forming the support for the spring 5. The top edge D of said annular wall $4_1$ is provided with slots $4_3$ (larger than those of FIG. 3) for air passage when said wall $4_1$ meets the top wall of valve-chamber $h$. In this arrangement, not only can the size of the stopper 4 be made smaller than that of FIG. 3, but also the mounting of the stopper 4 can be simplified. It also becomes possible to adjust the action of the control valve by changing the stopper and thereby appropriately selecting the weight of the piston. The above-mentioned slots $4_3$ may have curved or straight edges.

Although mounted on the floating piston 3 just like the stopper of FIG. 3 and FIG. 3a, the stopper indicated in FIG. 5 and FIG. 5a consists only of an annular body which is thicker than the clearance $i$ between the inner wall of the part 1 and the cylindrical portion F. The stopper is provided with bevels $4_3$ on the bearing surface D which contacts the top wall of valve-chamber. This stopper fits closely around the cylindrical portion F, which is very much simplified in construction. Consequently, the above-mentioned bevels $4_3$ can be formed as upward-inclined surfaces, so that the resistance to the passage of blow-by gas can be reduced. Thus, although less elastic than the previously described stoppers with respect to elasticity, the stopper illustrated in FIG. 5 and FIG. 5a is simpler in construction and more convenient for manufacture and installation. In this embodiment, the lower flanged portion E supports the spring 5.

The stopper illustrated in FIG. 6 is divided into two portions, with a cushion provided on each the two surfaces which come into contact with each other. In the case of FIG. 6, there is the part $4_4$ which fits against the top wall of valve-chamber and at the same time serves as a bearing surface for the spring. The part $4_4$ also engages the top edge D of the annular wall $4_1$. This arrangement is not limited to the FIGURE 6 embodiment only, but may also be used in the former two embodiments in the same way. In this arrangement, the noise caused when these parts strike each other can be more perfectly suppressed and the wear of the parts can be more perfectly prevented.

From the above descriptions it is apparent that the volumn of blow-by gas flowing through the control valve 6 can be freely regulated in relation to the negative pressure of intake manifold, thereby making it possible to apply the same control valve 6 to various engines, if the weights of the floating piston 3 and the stopper 4, the stiffness of the spring 5, and the number and configuration of the slots $4_3$ in the stopper 4 are appropriately selected; the gap $i$ between the inner wall of the part 1 and the outer surface of the cylindrical portion F is adjusted by the bore-standard system; and the inclination of the tapered portion B of the piston is properly adjusted.

The floating piston 3 is permitted to move vertically as well as to rotate around its own axis, and is devoid of any small orifice which is liable to be clogged with deposits of lubricating oil or vapour. Therefore, the floating piston 3, in its vertical and rotational motion, causes repeated slight contact between the inner wall of the part 1 and the cylindrical portion F of the piston and in consequence, the deposit in the gap $i$, if any, will invariably be scraped off. A blow-by gas flow control valve that can keep its original section of gas flow and work with high reliability is therefore provided. Meanwhile, the surface of piston 3 which acts as a seat is equipped with the stopper 4 made of a cushioning material, which mitigates the direct contact between opposing metallic parts, thereby greatly reducing the sound made when the floating piston 3 strikes the inside wall of valve-chamber, as resonated by the floating piston 3 in a certain range of engine loads. Thus it is obvious that this invention can offer a blow-by gas flow control valve which is quiet, wear-resistant and highly durable.

What is claimed is:

1. In a flow control valve for blow-by gas which comprises:
   a casing defining a central valve-chamber terminating at each end in shoulders encircling an upper air path for connecting said chamber to the intake manifold of an internal combustion engine and a lower air path for connecting said chamber to the crankcase respectively;
   a floating piston housed in said valve-chamber and comprising in succession a tapered portion, a cylindrical portion and an outwardly projecting flanged portion;
   a spring positioned between said flanged portion and the shoulder of valve-chamber encircling said upper air path and biassing said piston toward a valve-inactive position against the other shoulder in which said lower air path is closed;
   the improvement which comprises cushioning means additional to said spring and made of a material having the cushioning properties of hard rubber, said cushioning means comprising a part which is positioned between the shoulder encircling said upper air path and said flanged portion, and an annular wall part which rises from said first mentioned part and is provided with notches constituting transverse passages for blow-by gas, the cylindrical portion of said floating piston fitting into said upper air path with a clearance between said cylindrical portion and the casing wall defining said upper air path, which clearance provides a minimum passage section for the flow of blow-by gas passing through the notches in said annular part, when the floating piston is drawn upward against the force of said spring by negative pressure on the intake manifold side so as to grip the annular wall portion of said cushioning means between said flanged portion and the shoulder encircling said upper air path.

2. A flow control valve as claimed in claim 1, in which said cushioning means is formed as an annular body closely encircling the cylindrical portion of the floating piston, and in which said annular body is thicker than the clearance between the portion of the casing wall defining said upper air path and said cylindrical portion of the piston and said notches are formed in a surface of said annular body which engages the shoulder encircling said upper air path when said piston is drawn toward that shoulder.

3. A flow control valve as claimed in claim 2, in which the notches provided on the bearing surface of said cushioning means are formed by a plurality of beveled surfaces.

4. A flow control valve as claimed in claim 1 comprising an additional cushioning means between the flanged portion of said piston and the shoulder encircling said upper air path, one of said cushioning means being fixed to said last mentioned shoulder and the other to said flanged portion with said spring positioned therebetween.

References Cited
UNITED STATES PATENTS

| | | | |
|---|---|---|---|
| 780,986 | 1/1905 | Francis | 137—504 |
| 407,656 | 7/1889 | Hawkins et al. | 137—504 |
| 1,096,431 | 5/1914 | Kepple | 137—517 |
| 1,290,014 | 12/1918 | Patterson | 137—480 |
| 2,988,346 | 6/1961 | Sclure | 137—504 XR |
| 3,122,162 | 2/1964 | Sands | 137—504 XR |
| 3,354,898 | 11/1967 | Barnes | 137—480 XR |
| 3,359,960 | 12/1967 | Pittsley | 137—480 XR |

M. CARY NELSON, Primary Examiner

R. J. MILLER, Assistant Examiner

U.S. Cl. X.R.

137—504

PO-1050
(5/69)

UNITED STATES PATENT OFFICE
CERTIFICATE OF CORRECTION

Patent No. 3,503,417      Dated March 31, 1970

Inventor(s) Tadahide Toda and Mitsumasa Yamada

It is certified that error appears in the above-identified patent and that said Letters Patent are hereby corrected as shown below:

The heading of the patent should show the notation "Claims priority application filed in Japan October 29, 1966, Sho-41-100475"

SIGNED AND
SEALED
AUG 25 1970

(SEAL)
Attest:

Edward M. Fletcher, Jr.
Attesting Officer

WILLIAM E. SCHUYLER, JR.
Commissioner of Patents